(12) United States Patent
Kawai et al.

(10) Patent No.: US 6,582,787 B1
(45) Date of Patent: Jun. 24, 2003

(54) CONTAINER FOR PHOTORESIST LIQUID

(75) Inventors: Keiji Kawai, Toyokawa (JP); Yoshiaki Ito, Toyohashi (JP)

(73) Assignee: Aicello Chemical Co., Ltd. (JP)

( * ) Notice: Subject to any disclaimer, the term of this patent is extended or adjusted under 35 U.S.C. 154(b) by 0 days.

(21) Appl. No.: 09/412,501

(22) Filed: Oct. 5, 1999

(51) Int. Cl.$^7$ ............................ B65D 65/38; B67D 5/02
(52) U.S. Cl. ................. 428/36.7; 428/474.4; 428/475.8; 428/476.1; 428/476.3
(58) Field of Search .......................... 428/35.7, 36.7, 428/474.4, 475.8, 476.1, 476.3

(56) References Cited

U.S. PATENT DOCUMENTS

| | | | | |
|---|---|---|---|---|
| 4,894,267 A | * | 1/1990 | Bettle et al. ............... | 428/36.7 |
| 5,435,460 A | | 7/1995 | Osgar ........................... | 222/1 |

FOREIGN PATENT DOCUMENTS

| | | |
|---|---|---|
| EP | 0 126 473 A2 | 5/1984 |
| EP | 0 587 412 A2 | 9/1993 |
| EP | 0582044 A1 * | 2/1994 |
| GB | 2254306 A * | 10/1992 |
| JP | 09039176 | 2/1997 |
| JP | 11254575 | 9/1999 |
| WO | WO 97/01427 | 1/1997 |
| WO | WO 98/31742 * | 7/1998 |

* cited by examiner

Primary Examiner—Sandra M. Nolan
(74) Attorney, Agent, or Firm—Parkhurst & Wendel, L.L.P.

(57) ABSTRACT

A blow molded container for high purity liquid chemicals having (1) an inner layer formed of a high purity resin comprising at least one member including olefinic polymers of ethylene, propylene, butene-1, 4-methyl-pentene-1, hexene-1 or octene-1 and copolymers of ethylene and olefins other than ethylene; (2) an intermediate layer of a solvent-barrier resin including polyamides, polyvinyl alcohols, poly (ethylene-co-vinyl alcohols), polyesters and polyphenylene oxides; and (3) an external layer formed of a light-shielding substance-containing resin composition. The lowest absorbance of the total layers of the container is greater than 2.0 measured at a wavelength of not more than 400 nm. The total layers also have an absorbance that does not exceed 1.62 measured at a wavelength of 600 nm. The container is especially good for holding photoresist liquids.

5 Claims, 4 Drawing Sheets

CONTAINER FOR PHOTORESIST LIQUID

BACKGROUND OF THE INVENTION

The present invention relates to a container used for the storage of a high purity liquid chemical, which is used in the fields of semiconductors and liquid crystals as well as a method for discharging the high purity liquid chemical from the container. The rule for designing, for instance, integrated circuits have increasingly required a high degree of miniaturization of these semiconductor devices because of the recent rapid progress in the electronic devices. High purity liquid chemicals such as photoresist liquids used for such fine patterning techniques not only should possess excellent fundamental characteristics, but also should not give rise to any quality deterioration during the storage and transportation thereof. The term "quality deterioration" herein used means, for instance, an increase in the amount of impure fine particles in a photoresist liquid, degeneration of components thereof, quantitative changes in the composition, an increase in the quantity of impure metal elements or deterioration of light-sensitive components due to irradiation with light rays. The increase in the quantity of fine particles in such a photoresist liquid and the degeneration of the components thereof are mainly caused by dissolution of some components present in the container material into the photoresist liquid. If such a photoresist liquid is applied to a substrate to form a photoresist film, pinholes are formed on the substrate. In addition, the quantitative changes in the composition of the liquid are resulted from the permeation of an organic solvent present in the liquid into the exterior through the wall of the container. At this stage, the liquid entrains a change in its viscosity and the thickness of the resulting photoresist film is correspondingly changed.

The quality deterioration of these photoresist liquids has serious adverse effects on the quality of the resulting semiconductors and liquid crystal displays and yields thereof and would shorten the lifetime of the liquid per se.

There has been known the term "cleanness" as an indication for showing the extent of the quality deterioration due to any release of impure fine particles from a container during the storage of a photoresist liquid in the container over a long time period. The cleanness is evaluated by storing ultra high pure water or a photoresist liquid in a container to be examined for a predetermined period of time and then determining the number of fine particles, whose particle size is not less than 0.2 μm, present in 1 ml of the liquid stored in the container. More specifically, the cleanness can be defined by the following equation:

$$\text{Cleanness(number/ml)} = [c(\text{number}) \times a/2(\text{ml})] / [b(\text{ml}) \times a(\text{ml})] \quad (1)$$

In the equation (1), a represents the volume of the container; and b is the quantity of the liquid content taken from the container to be examined. First of all, the sample liquid for determining the initial cleanness of the liquid is taken from the container according to the following method. To a test container having a volume of a (ml), there is added ultra pure water or a photoresist liquid in an amount of a half of the volume, a/2 (ml), of the container, followed by shaking it for 15 seconds, allowing it to stand for 24 hours and then collection of a sample liquid. The container used for the determination of the initial cleanness is tightly sealed with a plug, then allowed to stand for a predetermined period of time and thereafter rotated three turns without forming any air bubble, followed by collection of a sample liquid used for the evaluation of the cleanness after storing the water or the photoresist. In the equation, c represents the number of fine particles, as determined using a particle counter, which are present in the whole liquid sample and have a particle size of not less than 0.2 μm. Thus, the initial cleanness and that determined after the storage over a predetermined period of time are calculated on the basis of the number of fine particles. In this respect, the lower the numerical value indicating the cleanness, the higher the quality of the photoresist liquid. If the cleanness is less than 100 particles/ml, such a liquid chemical can stably be stored without causing any quality deterioration of semiconductors and liquid crystal displays (LCD) and any reduction of the yield thereof.

As containers for storing photoresist liquids and related liquid chemicals, there have in general been used, for instance, glass containers, metallic containers and containers produced from monolayer polyethylene (PE) resins. However, the glass and metallic containers cannot ensure a high cleanness of the contents thereof since sodium ions are released from the glass container and each metal container releases ions of the corresponding metal constituting the container, such as iron ions. Moreover, a conventional container, formed from a polyethylene resin to which a composition having barrier properties is added, has a low cleanness. If a light-shielding pigment and a pigment dispersant are added to this polyethylene resin having a low light-shielding effect, the cleanness of the resulting container would be further impaired. The container for storing a photoresist liquid should have a good cleanness, a light-shielding effect and solvent-barrier properties and accordingly, all of the foregoing containers are not preferably used. In addition, other problems arise, for instance, the glass container is apt to be easily broken and the metal containers are heavy and thus inconvenient to handle.

SUMMARY OF THE INVENTION

The present invention has been developed for solving the foregoing problems associated with the conventional containers for storing and transporting high purity liquid chemicals and accordingly, it is an object of the present invention to provide a container, which never deteriorates the quality of high purity liquid chemicals such as photoresists during the storage and transportation thereof, which is hardly broken and which is also light-weight. Moreover, it is another object of the present invention to provide a method for easily and safely discharging such a high purity liquid chemical from the container for storage.

The following is the description of the present invention developed for achieving the foregoing objects. The invention will be described herein with reference to the accompanying drawings corresponding to embodiments of the invention.

As shown in FIG. 1, the container 1 for storing a high purity liquid chemical according to the present invention is one obtained by blow molding an inner layer 3, which consists of a high purity resin comprising at least one member selected from the group consisting of olefinic polymers of ethylene, propylene, butene-1, 4-methyl-pentene-1, hexene-1 or octene-1 and copolymers of ethylene and olefins other than ethylene; an intermediate layer 4 of a solvent-barrier resin, which comprises at least one member selected from the group consisting of polyamides, polyvinyl alcohols, poly(ethylene-co-vinyl alcohols), polyesters and polyphenylene oxides; and an external layer 5 consisting of a light-shielding substance-containing resin composition. The container 1 has the lowest absorbance for the whole layers 3, 4 and 5, as determined at a wavelength of not more than 400 nm using a spectrophotometer, equal to not less than 2.0; an absorptivity coefficient as determined at a wavelength of 400 nm, i.e., the absorbance at that wavelength for the whole layers 3, 4 and 5 of the container 1 divided by the thickness of the layers 3, 4 and 5, equal to not less than 1.5 mm$^{-1}$, and an absorptivity coefficient as determined at a wavelength of 600 nm equal to not more than 1.5 mm$^{-1}$. The container 1 is preferably provided with a grip 2.

The following is the description of the method for discharging a high purity liquid chemical 15 according to the present invention, in which the container 1 of the invention is used. The invention will be described with reference to the accompanying drawings corresponding to embodiments of the invention.

As shown in FIG. 2, the method for discharging a high purity liquid chemical comprises the steps of tightly accommodating, in a protective pressure container 12, 13, an inner container 1 from which one end of a liquid-discharge pipe 10 is guided to the exterior of the inner container 1, while the other end of the pipe is inserted into the inner container 1 down to the bottom thereof and which is filled with the high purity liquid chemical 15; and discharging the liquid chemical 15 through the liquid-discharge pipe 10 by the action of the pressure of a gas supplied from a pressure source 6 connected to the protective pressure container 13. The protective pressure container 12, 13 is not one made of any particular material inasmuch as the material can withstand a gas pressure of 0.1 to 3.0 kg/cm$^2$, since the container does not come in direct contact with the liquid chemical.

According to another embodiment, the method for discharging a high purity liquid chemical comprises, as shown in FIG. 3, the steps of tightly accommodating, in a protective container 22, 23, an inner container 1 from which one end of a liquid-discharge pipe 10 is guided to the exterior of the inner container 1, while the other end of the pipe is inserted into the inner container 1 down to the bottom thereof and which is filled with the high purity liquid chemical 15; and discharging the liquid chemical 15 through the liquid-discharge pipe 10 by the action of a pump 16 disposed in the course of the path for discharging the liquid chemical. A filter 14 is preferably connected to an open port 19 of the container 23.

A further embodiment of the method for discharging a high purity liquid chemical comprises, as shown in FIG. 4, the steps of accommodating, in a protective vessel 32, 33, in an inner pressure container 1 from which one end of a liquid-discharge pipe 10 is guided to the exterior of the inner container 1, while the other end of the pipe is inserted into the inner pressure container 1 down to the bottom thereof and which is filled with the high purity liquid chemical 15; and discharging the liquid chemical 15 through the liquid-discharge pipe 10 by the action of the pressure of a gas supplied from a pressure source 6 connected to the inner pressure container 1.

The inner container 1 for accommodating the high purity liquid chemical 15, as shown in FIGS. 2, 3 and 4, is preferably the container for storing a high purity liquid chemical as shown in FIG. 1.

BRIEF DESCRIPTION OF THE INVENTION

DETAILED DESCRIPTION OF THE INVENTION

Figure 1:
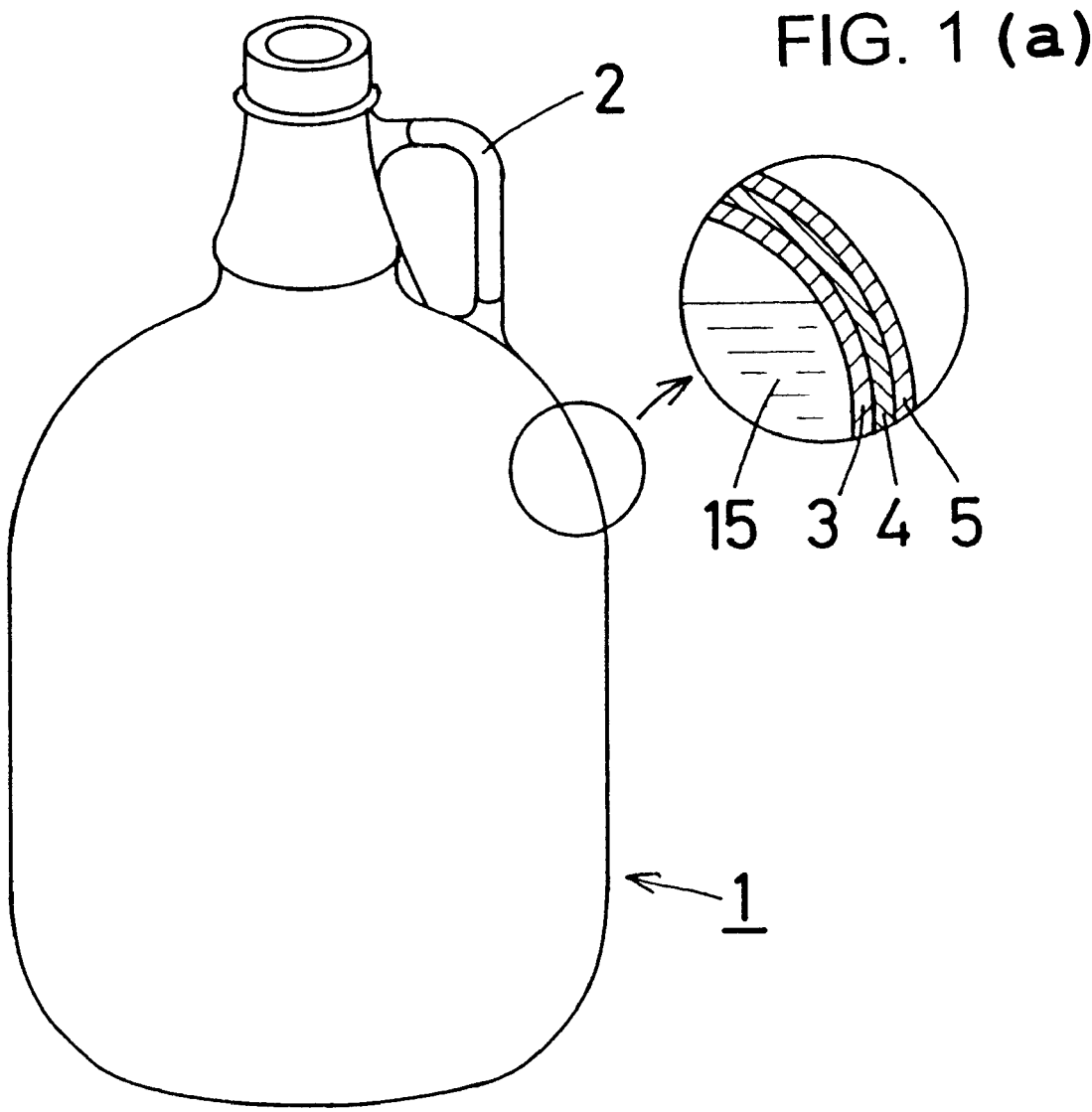
FIG. 1 is a schematic diagram showing an embodiment of the container for storing a high purity liquid chemical according to the present invention.

The present invention will hereunder be described in detail with reference to the accompanying drawings corresponding to embodiments of the present invention.

The container 1 for storing (or transporting) a high purity liquid chemical according to the present invention is produced by the following method. Raw materials used for producing the container 1 are an olefinic high purity resin for the inner layer 3, a resin having solvent-barrier properties (hereinafter referred to as "solvent-barrier resin") for the intermediate layer 4, and a light-shielding composition-containing resin or the external layer 5. The container 1 is produced by blow molding these ingredients into a structure comprising at least 5 layers including, from the inner side, olefin high purity resin layer/adhesive resin layer/solvent-barrier resin layer/adhesive resin layer/light-shielding composition-containing resin layer. The molding machines used for the blow molding may be those usually employed, inasmuch as they are provided with 4 screws. Each resin is melted in each corresponding extruder and then extruded into a cylindrical parison, followed by putting these extruded parisons in a mold, blowing a pressurized gas therein through a blowing pin and then cooling the blow-molded product to give a container 1.

The inner layer 3 comes into direct contact with the high purity liquid chemical 15 and therefore, it is very important to produce the same from a material which never releases fine particles and/or metal ions. Accordingly, the inner layer 3 is prepared from a high purity resin comprising at least one member selected from the group consisting of olefinic polymers of ethylene, propylene, butene-1, 4-methyl-pentene-1, hexene-1 or octene-1 and copolymers of ethylene and olefins other than ethylene. The resin composition for forming the inner layer 3 has a content of polymers, having a weight-average molecular weight of not more than $1 \times 10^3$ as determined by the gel permeation chromatography (GPC), of less than 5% by weight. The container formed from a resin composition having the content of such polymers of not less than 5% by weight permits easy release of impure fine particles into the high purity liquid chemical. Thus, the container has a cleanness of not less than 100 particles/ml and cannot used for storing a high purity liquid chemical at all.

The molecular weight of, for instance, resins is determined by the method in which resin pellets are dissolved in a solvent (o-dichlorobenzene) to give a sample solution and then the molecular weight and molecular weight distribution thereof are determined by GPC. The weight-average and number-average molecular weights are calculated according to the following relations, respectively:

Weight-average Molecular Weight=Σ($M$×$w$)/Σ$w$     (2)

Number-average Molecular Weight=Σ$w$/Σ($w$/$M$)     (3)

In these relations, M represents the molecular weight of a polymer component and w means the weight fraction thereof. The conditions for the GPC measurement are as follows: GPC apparatus used: 150 CV (available from Waters Company); column used: TSKgel GMH-HT (available from Tosoh Corporation); solvent used: o-dichlorobenzene; temperature: 138° C.; and detector used: differential refractometer.

In cases in which the inner layer 3 is composed of a copolymer, the content of α-olefin units in the copolymer is preferably not more than 15% by weight and the copolymer preferably has a molecular structure selected from atactic, isotactic or syndiotactic. Moreover, the polymerization method for the copolymer is preferably the low pressure and moderate pressure polymerization methods.

As an additive for the inner layer 3, a catalyst may, if necessary, be used in a desired amount upon the polymerization. Moreover, if a neutralizer, an antioxidant and a light stabilizer are added to the resin composition, they would be the source of impure fine particles since they may be released from the resulting container into the contents thereof. Therefore, the amount thereof to be added is quite important.

It is not necessary to use any neutralizer when the polymerization is carried out by the moderate pressure method, while the neutralizer is used as a chlorine atom scavenger in case of the low pressure method. As such neutralizers, there may be listed, for instance, stearates of alkaline earth metals such as calcium, magnesium and barium, but the amount thereof to be used should be limited to the lowest possible level by, for instance, improving the activity of the catalyst used in the polymerization step. If the content of the neutralizer exceeds 0.01% by weight on the basis of the resin composition, the resulting container has a cleanness of higher than 100 particles/ml and this in turn deteriorates the quality of semiconductors and LCD's and reduces the yield thereof. For this reason, the content of the neutralizer should be limited to a level of not more than 0.01% by weight based on the weight of the resin composition.

Examples of antioxidants usable herein are phenolic antioxidants such as butyl hydroxytoluene, pentaerythtyltetrakis [3-(3,5-di-t-butyl-4-hydroxyphenyl)propionate] and octadecyl-3-(3,5-di-t-butyl-4-hydroxyphenyl) propionate. The content of the antioxidant should be limited to not more than 0.01% by weight based on the weight of the resin composition for the same reason described above in connection with the neutralizer.

As the light-shielding stabilizers, there may be mentioned, for instance, benzotriazole type light-shielding stabilizers such as 2-(5-methyl-2-hydroxyphenyl) benzotriazole and 2-(3-t-butyl-5-methyl-2-hydroxyphenyl)-5-chlorobenzotriazole; and hindered amine type light-shielding stabilizers such as bis(2,2,6,6-tetramethyl-4-piperidine) sebacate and poly[[6-(1,1,3,3-tetramethylbutyl) amino-1,3,5-triazin-2,4-diyl] [(2,2,6,6-tetramethyl-4-piperidyl)imino]hexamethylene [(2,2,6,6-tetramethyl-4-piperidyl) imino]]. The content of the light-shielding stabilizer should be limited to not more than 0.01% by weight based on the weight of the resin composition for the same reason described above in connection with the neutralizer.

The content of the additives present in the resin composition is the value determined by extracting the resin composition with tetrahydrofuran (THF) using a Soxhlet extraction apparatus for 8 hours, separating the extract by liquid chromatography and then quantifying the amount of the additives. The conditions for the determination are as follows: apparatus used: GULLIVER (available from Nippon Bunko Co., Ltd.); column used: Finepak GEL 101 (available from Nippon Bunko Co., Ltd.): solvent used: THF; detector: UV-970 (available from Nippon Bunko Co., Ltd.) and 830-RI (available from Nippon Bunko Co., Ltd.).

The intermediate layer 4 consists of a solvent-barrier resin, which comprises at least one member selected from the group consisting of polyamides, polyvinyl alcohols, poly(ethylene-co-vinyl alcohols), polyesters and polyphenylene oxides. Examples of organic solvents used in the high purity liquid chemicals 15 are ketones such as methyl amyl ketone, used in the liquid photoresists; esters such as ethyl lactate; lactones such as γ-butyrolactone; and cellosolves such as ethyl cellosolve acetate. The solvent-barrier resin is selected depending on the organic solvent used.

The external layer 5 consists of a light-shielding substance-containing resin (composition). Any resin may fundamentally be used so far as it is a light-shielding composition-containing thermoplastic resin, but olefinic resins are preferably used. The resin composition for producing the external layer 5 further comprises less than 5% by weight of a pigment dispersant consisting of at least one olefin polymer selected from the group consisting of polyethylenes and polypropylenes having a number-average molecular, weight of not less than $2\times10^3$ and 0.01 to 5% by weight of at least one light-shielding pigment selected from the group consisting of inorganic pigments and organic pigments.

As the dispersants, there may be listed, for instance, olefin polymers such as polyethylene and polypropylene. The number-average molecular weight of the dispersant added to the resin composition for the achievement of high dispersibility of the pigments is not less than $2\times10^3$, and the content of the dispersant therein is preferably less than 5% by weight. This is because if the number-average molecular weight of the dispersant is less than $2\times10^3$, and/or the content thereof exceeds 5% by weight, the resulting container has an insufficient cleanness and cannot be suitably used for storing the high purity liquid chemicals.

Examples of the light-shielding pigments usable herein are inorganic pigments such as titanium oxide, carbon black, red iron oxide and silicon dioxide; and organic pigments such as phthalocyanine type, quinacridone type and azo type organic pigments. The content of the light-shielding, pigment preferably ranges from 0.01 to 5% by weight on the basis of the weight of the resin composition. If the content of the light-shielding pigment is less than 0.01% by weight on the basis of the weight of the resin composition, any desired light-shielding effect cannot be expected, while if it exceeds 5% by weight, the resulting container has an insufficient cleanness and thus cannot be suitably used for storing the high purity liquid chemicals.

The resin composition as the material for the external layer 5 more preferably comprises less than 2.5% by weight of an ultraviolet light absorber. Examples of such ultraviolet light absorbers are salicylic acid type ultraviolet light, absorbers such as phenyl salicylate and p-octylphenyl salicylate; benzophenone type ultraviolet light absorbers such as 2,4-hydroxybenzophenone and bis(2-methoxy-4-hydroxy-5-benzoylphenyl) methane; benzotriazole type ultraviolet light absorbers such as 2-(5-methyl-2-hydroxyphenyl) benzotriazole and 2-(3-t-butyl-5-methyl-2-hydroxyphenyl)-5-chlorobenzotriazole; and cyanoacrylate type ultraviolet light absorbers such as 2-ethylhexyl-2-cyano-3,3-diphenyl acrylate and ethyl-2-cyano-3,3-diphenyl acrylate. If the content of the ultraviolet light absorber in the resin composition exceeds 2.5% by weight, the resulting container has an insufficient cleanness and thus cannot be suitably used for storing the high purity liquid chemicals.

The container 1 for high purity liquid chemicals according to the present invention permits the storage of liquid photoresists and dilution solvents therefor used in the semiconductor production processes and for liquid crystal displays as well as other high purity liquid chemicals. Examples thereof are ultraviolet ray resists, far ultraviolet ray resists, electron beam resists, X-ray resists and color resists for liquid crystal displays. These photoresists for semiconductor-production processes are positive photoresists comprising, as essential components, an alkali-soluble resin such as cresol-formaldehyde novolak resin or poly (vinylphenol) and a quinone diazide type light-sensitive agent such as benzoquinone diazide sulfonate, naphthoquinone diazide sulfonate, benzoquinone diazide sulfonamide and naphthoquinone diazide sulfonamide. As color resists for liquid crystal displays, there may be listed, for instance, those each comprising a photopolymer, which consists of an acrylate monomer, a trihalomethyl triazine type photopolymerization initiator and an acrylic acid/acrylate copolymer, and an organic pigment dispersed therein. Such a photoresist includes a component sensitive to light rays having a wavelength ranging from 200 to 500 nm and therefore, the container for storing the same should have light-shielding properties. For this reason, the container 1 should have the lowest absorbance for the whole layers 3, 4 and 5, as determined at a wavelength of not more than 400 nm using a spectrophotometer, equal to not less than 2.0; an absorptivity coefficient as determined at a wavelength of 400 nm, i.e., the absorbance observed at that wavelength for the whole layers 3, 4 and 5 of the container 1 divided by the thickness of the layers 3, 4 and 5, equal to not less than 1.5 $mm^{-1}$. Alternatively, the container 1 should have the lowest absorbance for the whole layers equal to not less than 2.0; an absorptivity coefficient as determined at a wavelength of 400 nm equal to not less than 1.5 $mm^{-1}$ and an absorptivity coefficient, as determined at a wavelength of 600 nm, equal to not more than 1.5 $mm^{-1}$.

In addition, it is preferred to use adhesive resins such as commercially available modified polyolefin resins in an appropriate thickness in order to adhere the intermediate layer 4 to the inner layer 3 or the external layer 5.

The present invention will hereunder be described in more detail with reference to the following Examples.

EXAMPLE 1

In this Example, a container 1 for a high purity liquid chemical was made on a trial basis according to the following method.

The raw material used for forming the inner layer 3 was a polyethylene prepared by the moderate pressure polymerization method having a density of 0.955 $g/cm^3$, a melt index of 0.15 g/10 min and free of any neutralizer, antioxidant and light stabilizer. The polyethylene polymer has a content of polymer molecules, whose weight-average molecular weight as determined by GPC is not more than $1 \times 10^3$, of 1.41% by weight.

The raw material used for producing the intermediate layer 4 was an ethylene-vinyl alcohol copolymer resin having a density of 1.19 $g/cm^3$, a melt index of 1.3 g/10 min and an ethylene-copolymerization rate of 32 mole %.

The raw material used for producing the external layer 5 was a product obtained by dry blending 100 parts by weight of polyethylene pellets comprising 0.30% by weight of a polyethylene whose number-average molecular weight of not less than $2 \times 10^3$ as a pigment dispersant and having a density of 0.956 $g/cm^3$ and a melt index of 0.30 g/10 min with 3 parts by weight of a master batch comprising 5.3% by weight of red iron oxide as a light-shielding pigment and 0.2% by weight of carbon black.

The adhesive resin herein used was an adhesive polyolefin resin (HB500 available from Mitsui Toatsu Chemicals, Inc.) having a density of 0.94 $g/cm^3$ and a melt index of 0.2 g/10 min.

The molding of the container 1 was carried out using a multilayer blow-molding machine provided with 4 screws (available from BEKUM Company). Each resin was melted in each extruder at 200° C. and extruded into a cylindrical parison. These extruded parisons were put in a mold, followed by blowing a gas, at a pressure of 6 $kg/cm^2$, in the mold through a blow pin and cooling the mold to thus give a container 1. The container 1 produced on a trial basis had a 4 components-5 layered structure, i.e., inner layer/adhesive resin layer/intermediate layer/adhesive layer/external layer, which were 0.680/0.045/0.050/0.045/0.680 mm in thickness and had a volume of 4 liters.

Then the cleanness of the container 1 made on a trial basis was determined. To the container 1, there was added 2 liters of ultra pure water prepared using an ultra pure water-producing device (available from Toray Industries, inc. under the trade name of TORAYPURE LV-10T), then the container was tightly closed using a cap, followed by shaking the container for 15 seconds, allowing it to stand over 24 hours, collection of 5 ml of a sample and determination of the number of fine particles having a particle size of not less than 0.2 $\mu m$ released from the container to the ultra pure water using a particle counter (Type: KL-22 available from Lyon K. K.).

The number of fine particles present in the water was calculated using the following formula (4) similar to the formula (1) and the result was defined to be the cleanness with respect to ultra pure water. The results thus obtained are shown in the following Table 1.

Number of Fine Particles in Water (number/ml)=[Counts(particles)×Amt. Of Ultra Pure Water(2000 ml)]/[Amt. Of Sample(5 ml)×Container Volume(4000 ml)]   (4)

To the container, there was then added 2 liters of a positive resist (resist 1) comprising a solid content which included a cresol-formaldehyde novolak resin and a naphthoquinone diazide sulfonate type light-sensitive agent and methyl amyl ketone as a solvent, followed by repeating the same procedures used above to thus determine the cleanness using the following formula (5). The results thus obtained are likewise shown in Table 1.

Number of Fine Particles in Resist(number/ml)=[Counts(particles)×Amt. Of Resist(2000 ml)]/[Amt. Of Sample(5 ml)×Container Volume(4000 ml)]   (5)

In addition, the container 1 was again tightly closed with a cap and then allowed to stand over 6 months at ordinary temperature. After the elapse of 6 months, the container was rotated 3 turns without generating any air bubble to thus shake the resist 1 in the container, followed by collection of 5 ml of a sample. The same procedures used above were repeated to determine the number (particles/ml) of fine particles present in the resist 1, which was defined to be the cleanness after 6 months. The results obtained are summarized in Table 1.

TABLE 1

| Items Tested | | Cleanness (number/ml) | | | Rate of Weight Change (%) Methyl Amyl Ketone | |
|---|---|---|---|---|---|---|
| | | Pure | Resist | | | |
| Ex. No. | Liquid Content Container | Water* | Initial | 6 months | 23° C., 6 months | 40° C., 3 months |
| Ex. 1 | Multilayer Container | 12 | 8 | 26 | <0.01 | <0.01 |
| Ex. 2 | Multilayer Container | 10 | 11 | 22 | <0.01 | <0.01 |
| | Glass Bottle | 2365 | 79 | 121 | <0.01 | <0.01 |
| | PE Monolayer Bottle | >10,000 | >10,000 | >10,000 | 0.01 | 0.03 |
| | Metal Container | 261 | 648 | 759 | <0.01 | <0.01 |

*Ultra pure water

As has been shown in Table 1, the number of impure fine particles released from the container to the content thereof was very small and more particularly, the cleanness of the container was found to be 12 particles/ml for ultra pure water, and 8 particles/ml for the resist 1 and 26 particles/ml for the resist 1 after the storage over 6 months.

Then the trunk portion (size: 1×4 cm) of the container was cut out from the same and the absorbance thereof was determined over the wavelength ranging from 200 to 900 nm using a spectrophotometer (type: Ubest-55 available from Nippon Bunko Co., Ltd.). As a result, the container was found to show an extremely excellent light-shielding properties since the lowest absorbance was 2.42 at a wavelength of not more than 400 nm, and the absorbance and absorptivity coefficient thereof at a wavelength of 600 nm were 1.21 (transmittance: $10^{-0.79}\%$) and 0.77 $mm^{-1}$, respectively and those observed at wavelength of 400 nm were 2.42 (transmittance: $10^{-0.42}\%$) and 1.54 $mm^{-1}$, respectively. In this case, the thickness of the sample was found to be 1.57 mm.

Then 4 liters of methyl amyl ketone were introduced into the container 1, the latter was tightly closed with a cap and stored at 23° C. and 40° C. in a thermostatic chamber to determine the weight change (%) of the methyl amyl ketone with time. The results thus obtained are listed in the foregoing Table 1. The data listed in Table 1 clearly indicate that the container exhibited a quite low weight change and more specifically, the weight changes were found to be not more than 0.01% after storing at 23° C. for 6 months and not more than 0.01% after storing at 40° C. for 3 months.

Moreover, 4 liters of methyl amyl ketone were introduced into the container 1, the latter was tightly closed with a cap and stored at 23° C. in a thermostatic chamber to determine the metal ion concentration in the methyl amyl ketone after the 6 months storage using ICP-MS (HP-4500: available from Yokokawa-Analytical Systems Co., Ltd.). The results thus obtained are summarized in Table 2. As will be seen from the data listed in Table 2, any increase in the metal ion concentration was not observed at all, even after the storage at 23° C. over 6 months.

The film thickness herein means the thickness of a photoresist film obtained by applying the resist 1 onto a silicon wafer using a spin coater (4000 rpm) and then pre-baking the resist layer at 90° C. for one minute and the allowed variation thereof should fall within the range of ±0.5% of the initial value. In Table 3, the term "good" in the column entitled "Coating Properties" indicates that any pinhole was not formed and any striation was not observed. In addition, the term "good" in the column entitled "Overall Evaluation of Coating Properties" indicates that the variation in the thickness of the resist film falls within the range of ±0.5% of the initial value and that the coating properties of the resist is excellent.

Finally, the resist 1 was inspected for other characteristic properties. The resist 1 immediately after the production or after the storage for 3 months was applied onto a silicon wafer, which had been washed according to the usual method, under the predetermined conditions using a spin coater and then the resist layer thus applied was baked for one minute on a hot plate maintained at 90° C. Then the resist layer was exposed to light using a stepper for i-rays. The resulting wafer was baked on a hot plate maintained at 110° C. These wafers were developed with an alkali developer (2.38% aqueous solution of tetramethyl ammonium hydroxide) to give a positive pattern. The resulting positive patterns each was inspected for various properties such as the resolution, the effective sensitivity, the rate of remaining film, the presence of scum (developing residues) and the adhesion thereof to the silicon wafer. The results obtained are listed in the following Table 4.

TABLE 2

| | Metal ion Species | Metal Ion Concentration (ppb) | | | | | | | |
| --- | --- | --- | --- | --- | --- | --- | --- | --- | --- |
| | | Na | K | Ca | Mg | Fe | Al | Ni | Cr |
| Ex. 1 | Multilayer Container | <0.05 | <0.05 | <0.05 | <0.05 | <0.05 | <0.05 | <0.05 | <0.05 |
| Ex. 2 | Multilayer Container | <0.05 | <0.05 | <0.05 | <0.05 | <0.05 | <0.05 | <0.05 | <0.05 |
| Comp. Ex. | Glass Bottle | 0.13 | <0.05 | <0.05 | <0.05 | <0.05 | <0.05 | <0.05 | <0.05 |
| | PE Monolayer Bottle | <0.05 | <0.05 | 0.31 | <0.05 | <0.05 | <0.05 | <0.05 | <0.05 |
| | Metal Container | <0.05 | <0.05 | <0.05 | <0.05 | 0.24 | <0.05 | 0.11 | <0.05 |

The resist 1 which had been stored at 23° C. for 6 months was applied onto a silicon wafer using a spin coater and then the wafer and the photoresist film were inspected for the thickness and coating properties (such as the presence of pinholes and striation) in order to examine the influence of the permeation of the organic solvent from the resist 1 through the container 1 on the coating properties of the resist 1. The results obtained are summarized in the following Table 3.

TABLE 3

| Resist | Storage Time | Thickness (μm) | Coating Properties | Overall Evaluation of Coating Properties |
| --- | --- | --- | --- | --- |
| Resist 1 | 0 hr. | 1.021 | good | good |
| | 6 months | 1.022 | good | good |
| Resist 2 | 0 hr. | 1.042 | good | good |
| | 6 months | 1.043 | good | good |

TABLE 4

| Resist | Storage Time | Resolution (μm) | Sensitivity (msec) | Rate of Remaining Film (%) | Presence of Scum | Adhesion |
| --- | --- | --- | --- | --- | --- | --- |
| Resist 1 | 0 hr. | 0.40 | 340 | 100 | None | Good |
| | 3 months | 0.40 | 340 | 100 | None | Good |
| Resist 2 | 0 hr. | 0.35 | 370 | 100 | None | Good |
| | 3 months | 0.35 | 370 | 100 | None | Good |

As has been shown in Tables 3 and 4, the resist 1 after the storage over a long period of time does not undergo any quality deterioration, since there was not observed any significant change in the coating properties, resolution, sensitivity, rate of remaining film, presence of scum and adhesion to silicon wafers.

EXAMPLE 2

In this Example, the same procedures used in Example 1 were repeated except for the following to thus give a container: The raw material used for producing the external layer was a product obtained by dry blending 100 parts by weight of polyethylene pellets, which comprised 0.30% by weight of a polyethylene having a number-average molecular weight of not less than $2\times10^3$ as a pigment dispersant and having a density of 0.956 g/cm$^3$ and a melt index of 0.30 g/10 min; and 3 parts by weight of a master batch, which comprised 5.3% by weight of red iron oxide as a light-shielding pigment, 0.2% by weight of carbon black and 0.1% by weight of 2-hydroxy-4-octoxybenzophenone as an ultraviolet light absorber. In addition, the container had a 4 components-5 layered structure, i.e., inner layer/adhesive resin layer/intermediate layer/adhesive resin layer/external layer, which were 0.580/0.040/0.050/0.040/0.590 mm in thickness and had a volume of 4 liters.

Then the same procedures used in Example 1 were repeated to determine the cleanness, absorbance, weight changes and metal ion concentrations, except for using a positive photoresist (resist 2), which comprised a solid moiety including an alkali-soluble resin mainly comprising a cresol-formaldehyde novolak resin and additives such as naphthoquinone diazide sulfonate type light-sensitive substance and a solvent consisting of ethyl cellosolve acetate, in place of the resist 1 used in Example 1. The results thus obtained are shown in the foregoing Tables 1 and 2.

As will be seen from the results shown in Table 1, the number of impure fine particles released from the container to the content thereof (i.e., the resist 2) was very small and more particularly, the cleanness was found to be 10 particles/ml for ultra pure water, and 11 particles/ml for the resist 2 and 22 particles/ml for the resist 2 after the storage over 6 months. Moreover, the container exhibited a quite low weight change and more specifically, the weight changes were found to be not more than 0.01% after storing at 23° C. for 6 months and not more than 0.01% after storing at 40° C. for 3 months. As will be seen from the data listed in Table 2, any increase in the metal ion concentration was not observed at all, even after the storage at 23° C. over 6 months.

In addition, the container was found to show extremely excellent light-shielding properties in the ultraviolet light region, although it transmitted light rays to some extent in the visible light region. More specifically, the lowest absorbance thereof was 3.33 at a wavelength of not more than 400 nm, and the absorbance and absorptivity coefficient thereof at a wavelength of 600 nm were 1.62 (transmittance: $10^{-0.38}$%) and 1.25 mm$^{-1}$, respectively and those observed at wavelength of 400 nm were 3.33 (transmittance: $10^{-1.33}$%) and 2.56 mm$^{-1}$, respectively. In this case, the thickness of the sample was found to be 1.30 mm.

The same procedures used in Example 1 were repeated to determine the coating properties of the resist 2. The results obtained are listed in the foregoing Table 3. Moreover, the characteristic properties of the resist 2 were examined according to the same method used in Example 1 to thus evaluate the properties of the resulting positive pattern such as the resolution, effective sensitivity, rate of remaining film, presence of scum (developing residues) and adhesion to silicon wafers. The results obtained are shown in the foregoing Table 4.

As has been shown in Tables 3 and 4, the resist 2 after the storage over a long period of time does not undergo any quality deterioration, since there was not observed any significant change in the coating properties, resolution, sensitivity, rate of remaining film, presence of scum and adhesion to silicon wafers.

Comparative Example 1

The same procedures used in Example 1 were repeated except for using a glass bottle, a polyethylene (PE) monolayer bottle and a metal (SUS 304) container to thus determine the cleanness, absorbance, weight change and metal ion concentration. The results thus obtained are listed in the foregoing Table 1 and 2.

As shown in Table 1, the glass bottle-released a large number of impure fine particles into the liquid content thereof and more specifically, the cleanness of the glass bottle was found to be 2365 particles/ml for water, 79 particles/ml for the resist 1 and 121 particles/ml for the resist 1 after the storage of the resist over 6 months. In addition, the glass bottle also released a large amount of sodium ions into the liquid content thereof.

In addition, the PE monolayer bottle also released a very large number of impure fine particles into the liquid content thereof and more specifically, the cleanness of the PE monolayer bottle was found to be not less than 10,000 particles/ml for water, not less than 10,000 particles/ml for the resist 1 and not less than 10,000 particles/ml for the resist 1 after the storage of the resist over 6 months. Further, the PE monolayer bottle also released a large amount of calcium ions into the liquid content thereof.

Furthermore, the metal bottle released a large number of impure fine particles into the liquid content thereof and more specifically, the cleanness of the metal bottle was found to be 261 particles/ml for water, 648 particles/ml for the resist 1 and 759 particles/ml for the resist 1 after the storage of the resist over 6 months. In addition, the metal bottle also released large amounts of iron ions and nickel ions into the liquid content thereof.

As has been discussed above, all of these three kinds of containers used in this Comparative Example released a large quantity of impure fine particles and metal ions into their liquid contents and correspondingly, the liquid photoresist as a content of such a container was contaminated.

Figure 2:
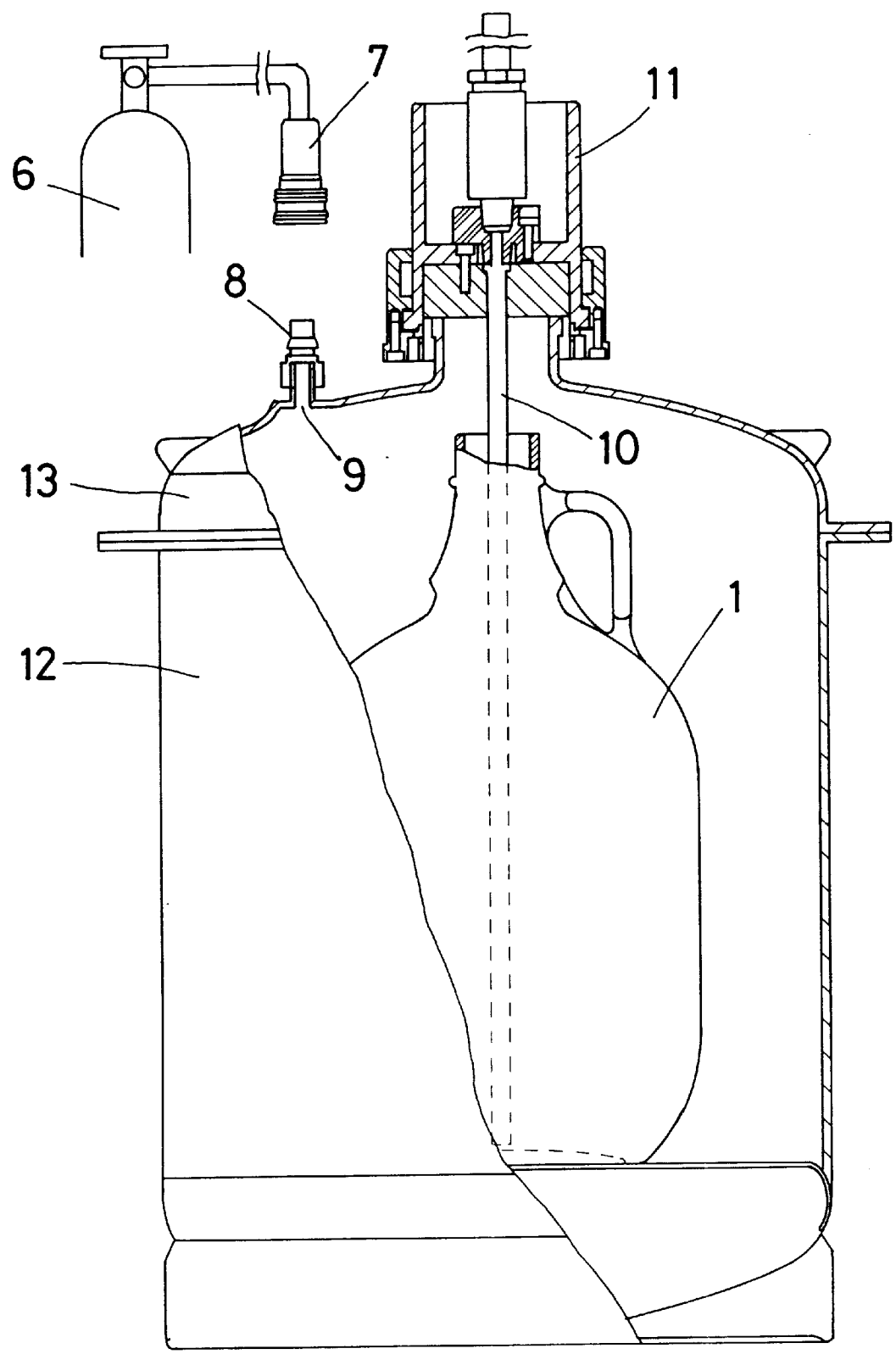
FIG. 2 is a partially sectional view showing the container for storing a high purity liquid chemical according to the present invention, which is in operation.

The method for discharging a high purity liquid chemical 15 according to the present invention will now be described in detail below using the container 1 produced, on a trial basis, in the foregoing Example, while referring to FIG. 2.

A high purity liquid chemical 15 is charged to an inner container 1 and the latter is placed on a predetermined position in a pressure container 12. One end of a liquid discharge pipe 10 is inserted into the inner container 1 down to the bottom thereof, while the other end of the discharge pipe 10 was guided to the exterior of the inner container 1. A connector 11 is secured to an upper cap 13 so as to inhibit any pressure release and the inner container is thus tightly closed by the upper cap 13 and the pressure container 12. On the other hand, a pressurized air or an inert gas such as nitrogen or argon gas is supplied from a pressure source 6. The pressure source 6 is a nitrogen bomb and connected to a socket 7 through a pressure hose. The socket 7 is in order connected to a plug 8 connected to a gas inlet 9 of the protective pressure container 13. A regulator of the nitrogen gas bomb is opened to supply the gas into the pressure container. Thus, the pressure of the gas is applied to the liquid surface of the high purity liquid chemical 15 contained in the inner container and a desired amount of the liquid chemical is discharged through the liquid discharge pipe 10.

Figure 3:
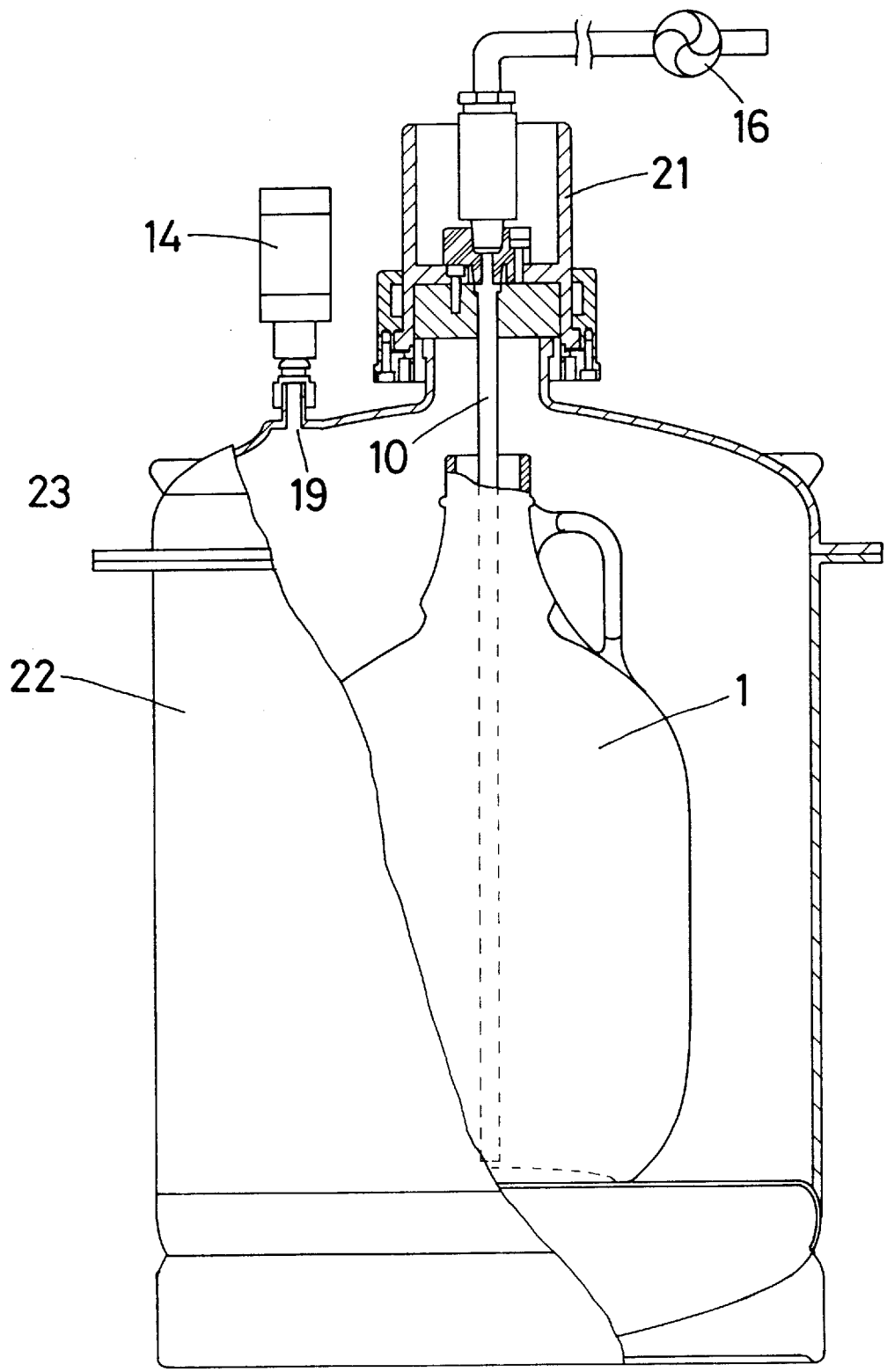
FIG. 3 is a partially sectional view showing the container for storing a high purity liquid chemical according to the present invention, which is in operation according to another embodiment.

Another method for discharging a high purity liquid chemical according to the present invention is shown in FIG. 3. One end of a liquid discharge pipe 10 is inserted into an inner container 1 to the bottom of the container, while the other end of the discharge pipe is guided to the exterior of the container 1. This inner container 1 is accommodated in a protective container 22, 23 and thus the high purity liquid chemical 15 is discharged through the liquid discharge pipe 10 by the action of a pump 16 arranged in the course of the path for liquid discharge. A filter 14 is connected to an opening 19 for controlling the pressure in the protective container. The operation of the pump 16 discharges a desired amount of the high purity liquid chemical 15.

Figure 4:
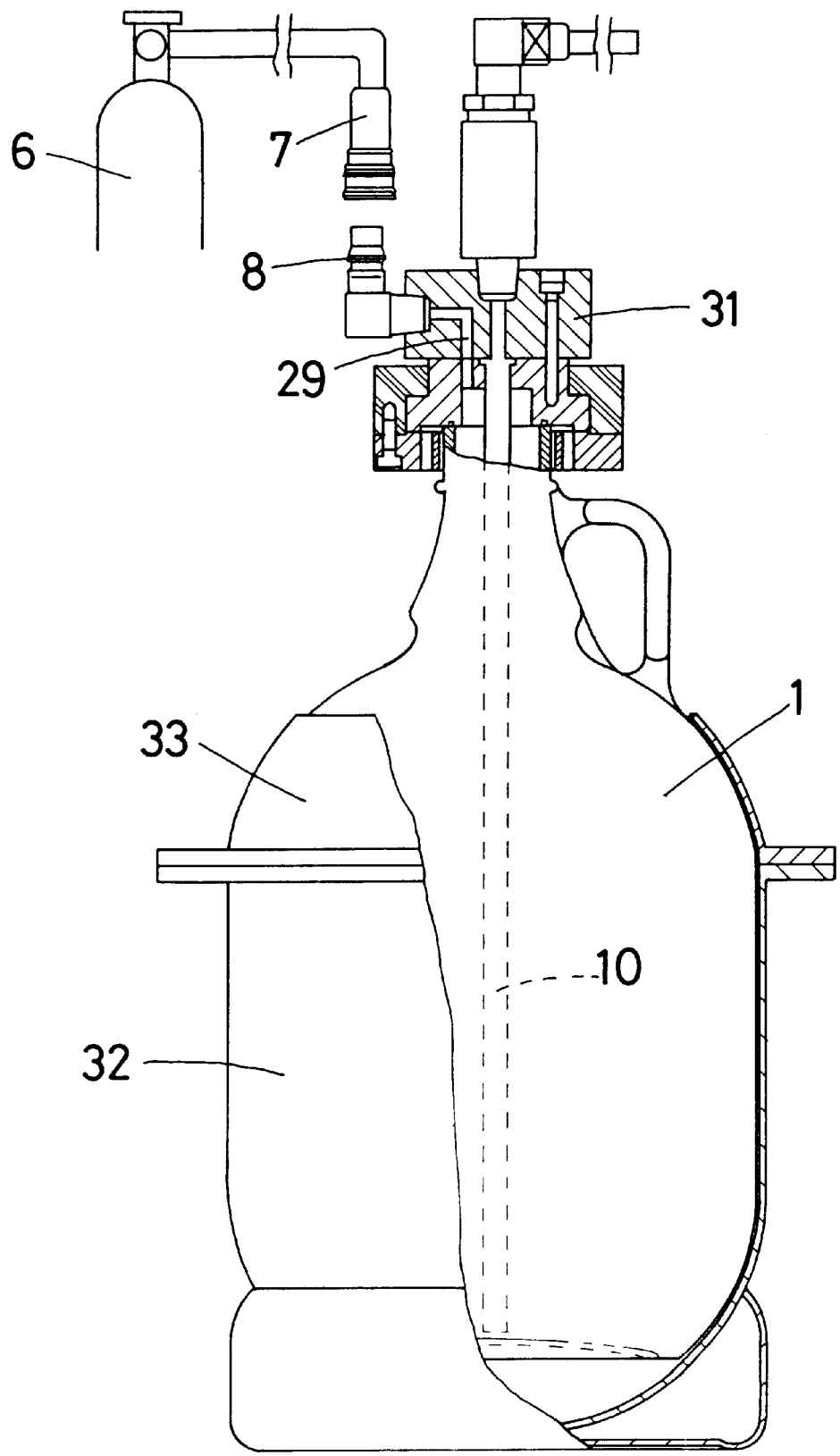
FIG. 4 is a partially sectional view showing the container for storing a high purity liquid chemical according to the present invention, which is in operation according to still another embodiment.

A still other method for discharging a high purity liquid chemical is shown in FIG. 4. An inner pressure container 1 in which one end of a liquid discharge pipe 10 is inserted down to the bottom thereof, while the other end of the pipe is guided to the exterior of the container and which is filled with a high purity liquid chemical 15 is accommodated in a protective container 32, 33 and tightly closed with a connector 31. Nitrogen gas is supplied to the protective container through a socket 7, which is connected to a pressure source 6. The socket 7 is connected to a plug 8, which is connected to a gas inlet 29 of the inner pressure container 1 and then nitrogen gas can be supplied to the protective container to thus discharge a desired amount of the high purity liquid chemical 15 through the liquid discharge pipe 10.

In a still further method for discharging a high purity liquid chemical, a filter 14 (see FIG. 3) is connected to a gas inlet instead of the pressure source 6 shown in FIG. 4, a pump 16 (see FIG. 3) is disposed in the course of a liquid discharge pipe 10 and the high purity liquid chemical 15 is discharged by operating the pump 16. Thus, a desired amount of the liquid chemical 15 can be discharged in the same manner discussed above.

As has been discussed above in detail, the container for high purity liquid chemicals according to the present invention never releases fine particles and metal ions during storage and/or transportation and can thus keep the quality of the contents thereof. Moreover, the container is hardly broken and light-weight. Any high purity liquid chemical can easily and safely be handled by adopting the discharge method according to the present invention, which makes use of the foregoing container.

What is claimed is:

1. A blow molded container for photoresist liquid, the container having light-shielding properties in the ultraviolet light region while permitting some transmission of light rays in the visible light region, comprising an inner layer, an intermediate layer, and an external layer, wherein (1) the inner layer is a resin comprising at least one olefinic polymer selected from polymers of ethylene, propylene, butene-1, 4-methyl-pentene-1, hexene-1 or octene-1 and copolymers of ethylene and olefins other than ethylene;

(2) the intermediate layer is a solvent-barrier resin comprising at least one member selected from the group consisting of polyamides, polyvinyl alcohol, copolymers of ethylene and vinyl alcohol, polyesters and polyphenylene oxides;

(3) the external layer is a resin composition containing a light-shielding substance;

(4) the lowest absorbance of the container is more than 2.0 determined at a wavelength of not more than 400 nm by spectrophotometer; and (5) the absorbance of the container is not more than 1.62 determined at a wavelength of 600 nm by spectrophotometer.

2. The container of claim 1, further comprising an adhesive layer between the inner layer and the intermediate layer.

3. The container of claim 1, further comprising an adhesive layer between the intermediate layer and the external layer.

4. The container of claim 1, wherein the resin composition of the external layer comprises less than 5% by weight of a pigment dispersant consisting of at least one olefinic polymer selected from the group consisting of polyethylene and polypropylene having a number-average molecular weight of not less than $2 \times 10^3$; and 0.01 to 5% by weight of at least one light-shielding pigment selected from the group consisting of inorganic and organic pigments.

5. The container of claim 1, wherein the resin composition of the external layer comprises less than 2.5% by weight of an ultraviolet light absorber.

* * * * *